United States Patent
Sierra et al.

(10) Patent No.: US 11,900,380 B2
(45) Date of Patent: Feb. 13, 2024

(54) BLOCKCHAIN ARCHITECTURE WITH RECORD SECURITY

(71) Applicant: Visa International Service Association, San Francisco, CA (US)

(72) Inventors: Andrew Sierra, Aurora, CO (US); Chackan Lai, San Jose, CA (US)

(73) Assignee: Visa International Service Association, San Francisco, CA (US)

(*) Notice: Subject to any disclaimer, the term of this patent is extended or adjusted under 35 U.S.C. 154(b) by 380 days.

(21) Appl. No.: 16/627,222

(22) PCT Filed: Aug. 7, 2017

(86) PCT No.: PCT/US2017/045772
§ 371 (c)(1),
(2) Date: Dec. 27, 2019

(87) PCT Pub. No.: WO2019/032089
PCT Pub. Date: Feb. 14, 2019

(65) Prior Publication Data
US 2020/0250676 A1 Aug. 6, 2020

(51) Int. Cl.
*G06Q 20/40* (2012.01)
*H04L 9/06* (2006.01)
(Continued)

(52) U.S. Cl.
CPC ..... *G06Q 20/4016* (2013.01); *G06Q 20/3825* (2013.01); *H04L 9/0637* (2013.01);
(Continued)

(58) Field of Classification Search
CPC ........... G06Q 20/4016; G06Q 20/3825; G06Q 2220/00; H04L 9/0637; H04L 9/0897;
(Continued)

(56) References Cited

U.S. PATENT DOCUMENTS

2007/0157028 A1* 7/2007 Lott ................. G06F 21/31
713/182
2015/0363769 A1* 12/2015 Ronca ............... G06Q 20/381
705/64
(Continued)

FOREIGN PATENT DOCUMENTS

CN 103532721 A * 1/2014
CN 106230808    12/2016
(Continued)

OTHER PUBLICATIONS

EP17921106.5, "Extended European Search Report", dated Jun. 9, 2020, 7 pages.
(Continued)

*Primary Examiner* — Neha Patel
*Assistant Examiner* — Chunling Ding
(74) *Attorney, Agent, or Firm* — Kilpatrick Townsend & Stockton LLP

(57) ABSTRACT

Described herein is a system in which an electronic record is stored within a distributed environment. In this system, a validation node may receive a transaction record from an acceptance node. The validation node may verify that the acceptance node is authorized 5 to participate in a blockchain network, identify a user associated with the transaction record, and append the transaction record to an electronic record. The transaction record may be associated with a digital signature formed by hashing multiple data elements, and then encrypting the hashed data elements using a private encryption key.

19 Claims, 8 Drawing Sheets

(51) Int. Cl.
*G06Q 20/38* (2012.01)
*H04L 9/08* (2006.01)
*H04L 9/30* (2006.01)
*H04L 9/32* (2006.01)
H04L 9/00 (2022.01)

(52) U.S. Cl.
CPC ............ *H04L 9/0897* (2013.01); *H04L 9/302* (2013.01); *H04L 9/3247* (2013.01); *G06Q 2220/00* (2013.01); *H04L 9/50* (2022.05); *H04L 2209/56* (2013.01)

(58) Field of Classification Search
CPC ... H04L 9/302; H04L 9/3247; H04L 2209/38; H04L 2209/56; H04L 9/3239; H04L 9/50
See application file for complete search history.

(56) References Cited

U.S. PATENT DOCUMENTS

| | | | |
|---|---|---|---|
| 2016/0283920 A1 | 9/2016 | Fisher et al. | |
| 2016/0292672 A1 | 10/2016 | Fay et al. | |
| 2016/0328713 A1 | 11/2016 | Ebrahimi | |
| 2016/0342989 A1 | 11/2016 | Davis | |
| 2017/0005804 A1 | 5/2017 | Zinder | |
| 2017/0148021 A1 | 5/2017 | Goldstein et al. | |
| 2017/0180134 A1* | 6/2017 | King | H04L 63/045 |
| 2017/0213209 A1 | 7/2017 | Dillenberger | |
| 2017/0346807 A1* | 11/2017 | Blasi | H04L 63/0442 |
| 2018/0139056 A1* | 5/2018 | Imai | H04L 9/3247 |
| 2018/0247320 A1* | 8/2018 | Gauld | G06Q 30/0201 |
| 2018/0276666 A1* | 9/2018 | Haldenby | G06Q 20/10 |
| 2019/0108513 A1* | 4/2019 | Kano | H04L 63/126 |
| 2019/0179801 A1* | 6/2019 | Jang | G06F 16/137 |

FOREIGN PATENT DOCUMENTS

| | | | | |
|---|---|---|---|---|
| CN | 106295401 A | 1/2017 | | |
| CN | 106485167 | 3/2017 | | |
| KR | 101701131 | 2/2017 | | |
| WO | WO-2007042062 A1 * | 4/2007 | ............ | G06Q 20/04 |
| WO | 2017066002 A1 | 4/2017 | | |
| WO | 2017127564 | 7/2017 | | |
| WO | WO-2017127564 A1 * | 7/2017 | ........... | G06Q 20/065 |

OTHER PUBLICATIONS

PCT/US2017/045772, "International Search Report and Written Opinion", dated May 1, 2018, 15 pages.
Application No. SG11201913992X, Notice of Decision to Grant, dated Sep. 7, 2022, 6 pages.
"Blockchain-Based Credit Score Coming in 2016, Forecasts Yandex, the 4th Largest Search Engine Worldwide", https://cointelegraph.com/news/blockchain-based-credit-score-coming-in-2016-forecasts-yandex-the-4th-largest-search-engine-worldwide, Dec. 25, 2015, 3 pages.
"The Blockchain Will Change Everything", http://www.rayhammond.com/wp-content/uploads/The-Blockchain-Will-Change-Everything-paper.pdf, 9 pages.
Application No. CN201780093706.9, Office Action, dated Feb. 1, 2023, 9 pages.
Application No. CN201780093706.9, Notice of Decision to Grant, dated Apr. 28, 2023, 4 pages.

* cited by examiner

BLOCKCHAIN ARCHITECTURE WITH RECORD SECURITY

The present application is a U.S. National Stage of PCT/US2017/045772 filed Aug. 7, 2017, the entire disclosure of which is incorporated herein by reference in its entirety for all purposes.

BACKGROUND

Before a resource provider completes a transaction with a user, it is often desirable for the resource provider to determine a level of risk for the transaction. For example, a banking institution may want to assess the risks associated with extending a line of credit to a particular person or business. In conventional systems, resource providers may consult with credit bureaus or other entities to determine a level of risk for each user.

However, such credit bureaus and other entities may only constitute a single source of information. As a result, retrieval of data from such entities may be slow and burdensome. Furthermore, the data held by such entities could be corrupted or erroneous due to human error or computer malfunction. Accordingly, improved systems and methods to address such problems are desirable.

Embodiments of the invention address these and other problems, individually and collectively.

BRIEF SUMMARY

Embodiments of the disclosure are directed to a system in which an electronic record (e.g., a ledger) may be generated for a user within a distributed environment. The electronic record may comprise a number of transaction records that involve the user, where the transaction records are each associated with a resource provider entity and signed by a service provider using that service provider's private key. Transaction records may be associated with a user and may be appended to a ledger associated with that user as they are received by the service provider. In some embodiments, transaction details and/or user information may be hashed in order to prevent unauthorized access of personal details. The hashed information related to both a transaction and a user may be combined, hashed again, and then signed using a private key to form a signature, which can be used to verify the authenticity of the transaction details and the user information in the ledger. The authenticity of this information may be verified by a resource provider that wishes to provide a resource to the user. In some embodiments, the resource provider can re-generate the above-described hashed, and combined data. The user can then public key corresponding to the private key to verify the signature.

One embodiment of the invention is directed to a method comprising: receiving a transaction record for a transaction conducted between an acceptance node and a user, the transaction record including at least information related to the user and transaction details; identifying, based on the information related to the user, a blockchain associated with the transaction; appending the transaction record to the blockchain; generating a signature by: generating a first hash of at least a portion of the information related to the user, generating a second hash of at least a portion of the transaction details, combining the first hash and the second hash into a text string, and signing the text string using a private key associated with the validation node to form the signature, and attaching the signature to the transaction record within the blockchain.

Another embodiment of the invention is directed to a validation node server comprising one or more processors and a memory. The memory includes instructions that, when executed by the one or more processors, cause the validation node server to: receive a transaction information for a transaction conducted between the acceptance node and a user, the transaction information including at least user information and transaction details; identify a blockchain associated with the transaction; generate a transaction record based at least in part on the transaction information; append the transaction record to the blockchain; generate a signature by: generating a first hash of at least a portion of the user information, generating a second hash of at least a portion of the transaction details, combining the first hash and the second hash into a text string, and signing the text string using a private key associated with the validation node to form the signature; and attach the signature to the transaction record within the blockchain.

Another embodiment of the invention is directed to a resource provider computer comprising one or more processors, and a memory including instructions that, when executed by the one or more processors, cause the resource provider computer to receive a request to complete a transaction between the resource provider computer and a user, the request including at least information related to the user; access a user blockchain associated with the user, the user blockchain generated by a validation node server and comprising a plurality of transaction records; verify at least one transaction record of the plurality of transaction records using the information related to the user, information included in the at least one transaction record, and a public key associated with the validation node server; determine, upon verifying the at least one transaction record, a level of risk for the transaction based on the plurality of transaction records; and complete the transaction upon determining that the level of risk for the transaction is below a threshold level of risk.

These and other embodiments of the invention are described in further detail below.

DETAILED DESCRIPTION

Figure 1:
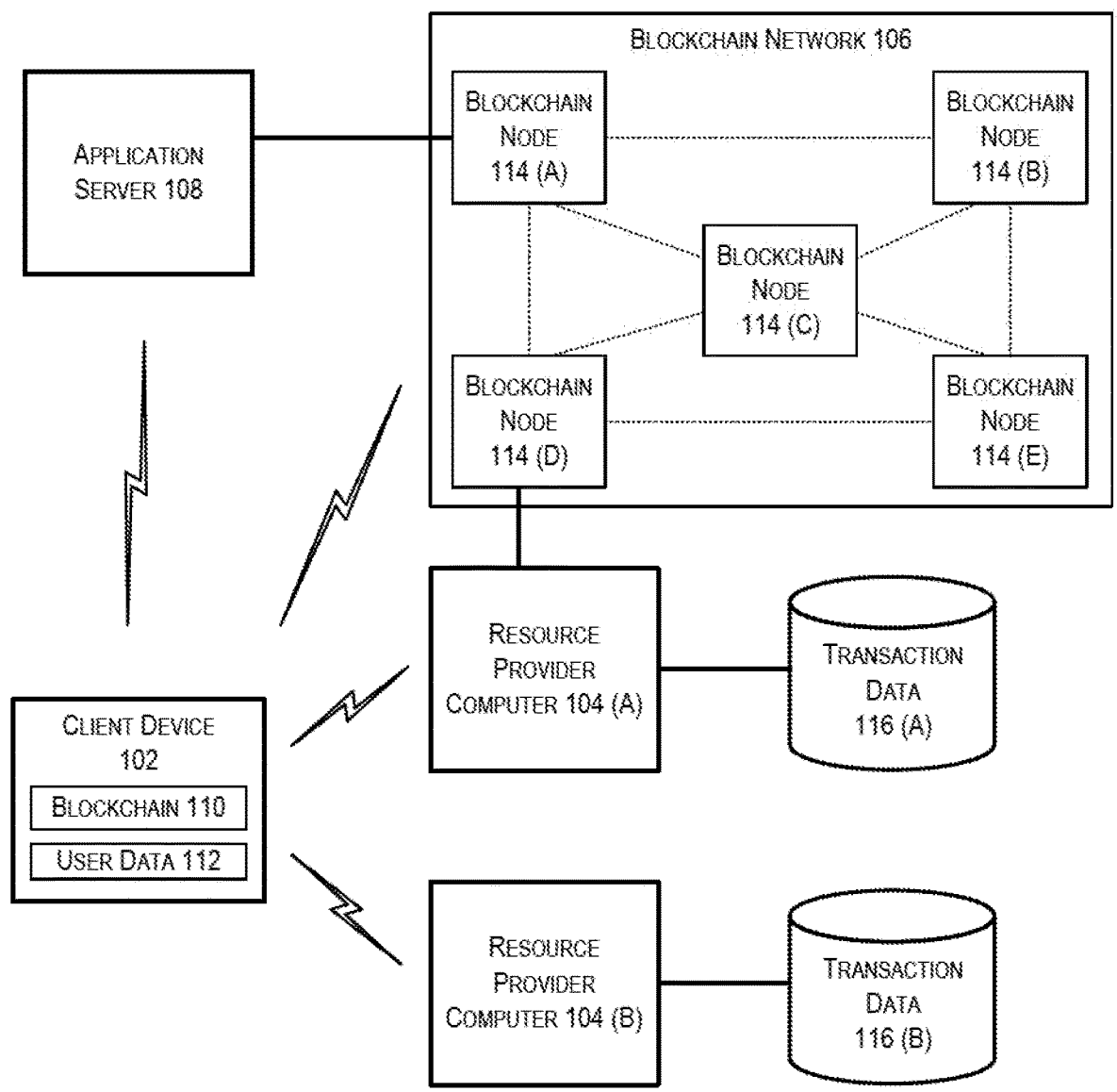
FIG. 1 depicts a block diagram of an exemplary system in which an electronic record associated with a user may be distributed to, and verified by, a resource provider in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "application server" may be any computing device configured to provide remote support for a client device. The application server may be associated with a set of computer executable instructions to be installed on, and executed from, a client device (e.g., a mobile application). The application server may provide any suitable service and/or processing for the client device. For example, the application server may perform calculations on behalf of the client device. In some embodiments, the application server may maintain an account for one or more users. The application server may also store any protocols and/or user preferences related to the operation of the client device.

A "blockchain" may be a distributed database that maintains a continuously-growing list of records secured from tampering and revision. A blockchain may include a number of blocks of transaction records for a number of users. Each block in the blockchain can also contain a timestamp and a link to a previous block. Stated differently, transaction records in a blockchain may be stored in an electronic records as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network. Any node within the blockchain network may subsequently use the blockchain to verify transactions.

A "client device" may be any electronic device capable of establishing a communication session with another electronic device (e.g., an application server) and transmitting/receiving data from that device. A client device may include the ability to download and/or execute mobile applications. Client devices may include mobile communication devices as well as personal computers and thin-client devices.

A "cryptographic key" may be any string of bits used by a cryptographic algorithm to transform plain text into cipher text or vice versa. Cryptographic keys may include symmetric and asymmetric keys. A cryptographic key may be used to sign transactions and/or verify signed transactions. For example, a cryptocurrency transaction may be signed using a private key. The signed transaction may then be verified using a public key that corresponds to the private key.

An "electronic identifier" may be any suitable string of characters or symbols used to identify an entity (e.g., a person or device). In some embodiments, the electronic identifier may be a value calculated by hashing one or more input values available to multiple entities. In this way, the electronic identifier may be independently generated by any entity that has the prerequisite information. In order to prevent an electronic record from being accessed by an unauthorized party, an electronic identifier may be hashed or encrypted. For example, an electronic identifier may comprise a combination of a country code, customer name, date of birth, and last four digits of a social security number such as SHA256(USA*JOHN SMITH*19700101*1234). Hashing this value may result in a seemingly random string of characters, such as 444E982513BF546050C2D079FF5D65AB6E318E1AB5 C1C.

An "electronic record" may be any record of transactions stored electronically. For example, an electronic record may comprise a number of transaction records associated with an electronic identifier. In some embodiments, an electronic record may be compiled by identifying each of the transaction records recorded in a distributed environment that are associated with a particular electronic identifier. In some embodiments, the electronic record may include a portion generated by, and signed using a private key associated with, the user with which the electronic identifier is associated. In some embodiments, the electronic record may be in the form of a blockchain.

A "ledger" may be any electronic record that includes transaction records. In some embodiments, a ledger may be an electronic record which is generated by a blockchain network such that as transaction records are appended to the ledger, they are linked to previous transaction records and signed using a private key. The authenticity of the ledger may then be verified by any entity in possession of the transaction record information and a public key associated with the private key.

A "mobile communication device" may be any portable electronic device that has a primary function related to communication. For example, a mobile communication device may be a smart phone, a personal data assistant (PDA), or any other suitable handheld device. The mobile communication device may be configured to input cryptocurrency addresses and display any received aliases. In some embodiments, the mobile communication device may be configured to store a private key to be associated with a cryptocurrency address and/or alias.

A "private key" is a type of cryptographic key that is kept secret by a party. A private key may be used to sign transactions such that they may be verified using the blockchain network.

A "public key" may be a type of cryptographic key that is distributed to, or available to, some entity over than a party holding a corresponding private key. In some embodiments, the key may be publically available, while in other cases it may be distributed to nodes in a network, but the network itself may not be accessible to the general public. A public key may be made available to nodes of a blockchain network and/or resource providers so that signed transactions associated with the public key may be verified by the nodes.

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may be a good or service, a physical building, a computer account or file, or a payment account. In some embodiments, a resource may refer to a financial product, such as a loan or line of credit.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "transaction record" may be any indication of a transaction conducted between a user and another entity. A transaction record may include a number of details related to the transaction conducted. For example, the transaction record may include an indication as to the parties involved in the transaction, the type of transaction conducted, an amount for which the transaction has been conducted, or any other suitable information.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

Details of some embodiments of the present invention will now be described.

FIG. 1 depicts a block diagram of an exemplary system in which an electronic record associated with a user may be distributed to, and verified by, a resource provider in accordance with at least some embodiments. In FIG. 1, a client device 102 may be in communication with one or more separate entities via a network connection. For example, the client device 102 may be capable of establishing communication with a resource provider computer 104, a blockchain network 106, and/or an application server 108. In some embodiments, the system may include multiple resource provider computers 104 (each of which may be associated with different resource provider entities) and/or a blockchain network 106. In some embodiments, the blockchain network may be a federated blockchain network in which only authorized entities may participate. The blockchain network may be operated on behalf of a service provider entity.

The client device 102 may comprise any suitable computing device capable of interacting, storing, and managing an electronic record (e.g., a ledger) in accordance with embodiments of the disclosure. The client device 102 may include at least a processor and a memory. The memory of the client device 102 may include at least an electronic record (e.g., ledger 110) and user data 112. The memory may also include computer-executable instructions that cause the processor to perform certain functions in accordance with embodiments of this disclosure. For example, the memory may include a mobile application that causes the mobile device to initiate a transaction using the stored electronic record. This may involve providing the ledger 110 and the user data 112 to a resource provider computer 104.

The memory of the client device 102 may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities. Sensitive information (e.g., the user data 112) received by the client device 102 may be stored in the secure memory.

In some embodiments, the client device 102 may also establish a connection with an application server 108 that provides back end support for the client device 102 by maintaining and managing electronic records associated with a user and/or client device 102. In some embodiments, upon execution of a mobile application, the client device 102 may establish a communication session with an application server in which at least some processing is performed by the application server on behalf of the mobile application. In some embodiments, the application server 108 may maintain an account associated with the client device 102 and/or its user. The account maintained by the application server 108 may store a number of data related to the user. For example, the application server 108 may store user data 112, ledger 110, or any other suitable user data. The application server 108 may, upon receiving a request from the mobile application, compile at least a portion of the user data that it maintains into data file to be provided to the client device 102. For example, the application server 108 may provide the mobile application on the client device 102 with a copy of the ledger 110 and user data 112 upon request. In some embodiments, the application server 108 may be in communication with, and receive updated information from, the blockchain network 106.

In some embodiments, the client device 102 may include a communication interface configured to enable communication between the client device 102 and another electronic device (e.g., resource provider computer 104, application server 108, and/or a wireless router that manages access to a network). Examples of a suitable communication interface may include radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, the communication interface may include an infrared communication device. In some embodiments, the communication interface may include both long range and short range communication means. For example, the communication interface may include an antenna configured to connect to a cellular network in order to enable communication with various other components of the depicted architecture.

A blockchain network 106 may comprise a distributed environment implemented across number of blockchain nodes 114 (A-E), each of which represents a computing system or component. An example of a blockchain node server 114 that may be implemented in accordance with various embodiments is described in greater detail with respect to FIG. 2. A copy of a blockchain (a record of electronic records) may be distributed to each blockchain node 114 within the blockchain network 106. In some embodiments, at least some of the blockchain nodes 114 may each be owned and/or operated by at least one of a service provider entity or a resource provider entity. In some embodiments, the blockchain network 106 may comprise a number of computing devices operated by entities that each belong to a particular group or have obtained a particular certification. In some embodiments, at least one of a resource provider computer 104, a client device 102, or an application server 108 may be a blockchain node 114. Additionally, one or more of the blockchain nodes 114 may be a validation node and a number of blockchain nodes 114 may be acceptance nodes. A validation node may be a blockchain node 114 which is operated by a service provider that operates the blockchain network 106. In some embodiments, only a validation node may sign transaction records using a private key associated with the service provider. An acceptance node may be a blockchain node 114 which is operated by resource provider computer or client device that participates in the blockchain network 106.

In accordance with at least some embodiments, the blockchain network 106 may comprise a federated and/or permission-based environment. For example, in order to participate in, or use, the blockchain network 106, an entity may need to be certified or otherwise authenticated. For example, the blockchain network 106 may require that each entity be subject to trust services management (TSM) policies and/or rules. In some examples, different entities may be subject to different policies based on the type of entity that it is. For example, servers associated with a banking institution may be trusted automatically, whereas servers associated with an individual may need to receive certification from a banking institute. In these examples, only trusted entities may have access to, or participate in, the blockchain network 106.

In some embodiments, record data maintained by the blockchain network 106 may be stored such that it is not easily associated with a particular user or account holder. For example, the record data may comprise a number of resource locator addresses that reference user data without an indication of the user. In some embodiments, the blockchain network 106 may store a record of a user related to each resource locator address in a separate data store (e.g., as a separate ledger 110).

The resource provider computer 104 may comprise any suitable computing device capable of performing the operations described herein. An example of a resource provider computer 104 that may be implemented in accordance with various embodiments is described in greater detail with respect to FIG. 2. As described with respect to FIG. 2, the resource provider computer 104 may provide access to one or more resources. In some embodiments, each resource provider computer 104 (A-B) may maintain a respective database that includes transaction data 116 (A-B). The transaction data 116 may include records of transactions conducted between the resource provider computer 104 and a number of users.

In some embodiments, the resource provider computer 104 may be configured to receive information (such as an indication of an electronic record), perform a verification of the electronic record, and determine a credit status for a user based on that information. In some embodiments, the electronic record may be received from the client device 102 (or from an application server 108 on behalf of the client device 102). In some embodiments, the client device 102 may transmit a location or address to the resource provider computer 104 at which the electronic record is located. The resource provider computer 104 may then request the electronic record or additional account-related information from the blockchain network 106. For example, the resource provider computer 104 may, upon receiving an electronic record from the client device 102, verify (e.g., by using the service provider entity's public key) the service provider entity's signature in the electronic record and determine, based on information within the electronic record, a credit status of the user associated with the electronic record.

In some embodiments, the resource provider computer 104 may also be a blockchain node 114, having access to, and participating in the operation of, the blockchain network 106. In some embodiments, the resource provider computer 104 may not have access to the blockchain network 106, but may be provided with a public key that may be used to verify electronic records associated with the blockchain network 106.

By way of illustrating interactions between various components of the system described herein, consider a scenario in which a user first conducts a transaction with the resource provider 104 (A). For the purposes of this scenario, assume that resource provider 104 (A) has access to the blockchain network 106, which is operated by a third-party service provider (i.e., a service provider unaffiliated with the resource provider computer 104). In this scenario, the resource provider computer 104 may record details related to the transaction in a database of transaction data 116 that it maintains. Additionally, the resource provider computer 104 transmits the transaction details (which include details of the transaction as well as details of the user) to the blockchain network 106.

Upon receiving the transaction details from the resource provider computer 104, the blockchain network 106 verifies that the resource provider computer 104 is certified and/or authorized to participate in the described system. The blockchain network 106 then generates a transaction record from the transaction details, which it then signs (using a private key associated with the blockchain network 106) and appends to a ledger associated with the user. In some embodiments, the updated ledger may be transmitted to a client device 102 associated with that user (e.g., via a push notification). In some embodiments, the client device 102 may be given access to a location in which the ledger is stored.

Continuing with the above scenario, the user may elect to conduct a second transaction with resource provider computer 104 (B) in which the user may need to show creditworthiness. Resource provider computer 104 (B) may or may not have access to the blockchain network 106, but should have access to a public key associated with the blockchain network 106 (e.g., the public key may be stored locally). In order to show creditworthiness, the user may transmit the ledger from the client device to the resource provider computer 104 (B) along with relevant data (e.g., user data and/or a transaction record). The resource provider computer 104 (B) is then able to verify the authenticity of the electronic record using the public key. Once verified, the resource provider computer 104 (B) may make a determination as to the user's creditworthiness based on the provided ledger, which includes an indication of the user's past transaction records. In embodiments in which the resource provider computer 104 (B) does not have access to the blockchain network 106 (e.g., in instances in which access to the Internet is restricted or limited), this allows the resource provider computer 104 (B) to perform a credit check locally while ensuring the veracity of the credit report data. By way of furthering this illustrative scenario, the resource provider computer 104 (B) may later provide the transaction details to the blockchain network (e.g., when Internet access is restored), which may subsequently update the user's ledger based on the transaction details.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy.

Figure 2:
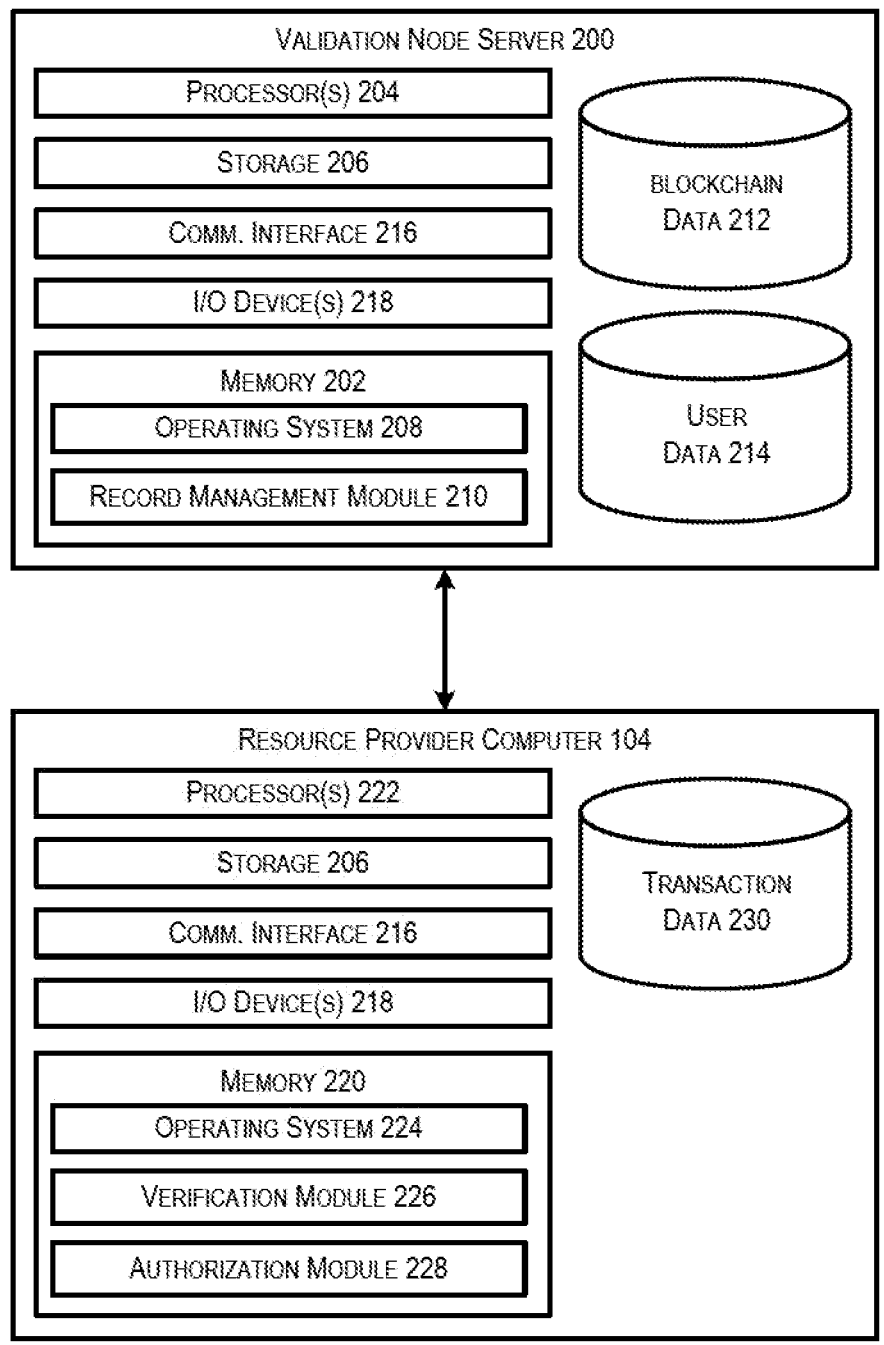
FIG. 2 depicts a diagram of an exemplary blockchain node server and an exemplary resource provider computer 104 in accordance with at least some embodiments.

FIG. 2 depicts a diagram of an exemplary blockchain node server 114 and an exemplary resource provider computer 104 in accordance with at least some embodiments. The validation node server 200 may be an example blockchain node server 114 of FIG. 1. The resource provider computer 104 may be an example resource provider computer 104 of FIG. 1.

The validation node server 200 may be any type of computing device capable of receiving a transaction record from a resource provider computer 104, updating a ledger associated with a user to include information from the transaction record, signing the ledger using a private key, and distributing the ledger to a client device associated with the user. In at least some embodiments, the resource provider computer 104 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202, or any other memory described herein, may store program instructions that are loadable and executable on the processors, as well as data generated during the execution of these program instructions. The memory may be volatile (such as random access memory (RAM)) and/or non-volatile (such as read-only memory (ROM), flash memory, etc.). The validation node server 200 may also include additional storage 206, such as either removable storage or non-removable storage including, but not limited to, magnetic storage, solid-state storage, optical disks, and/or tape storage. The disk drives and their associated computer-readable media may provide non-volatile storage of computer-readable instructions, data structures, program modules, and other data for the validation node server 200. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for generating and managing electronic records associated with users (record management module 210). The memory 202 may also include ledger data 212, which provides data associated with a user's transaction history and user data 214, which provides data associated with a user and/or account.

In some embodiments, the record management module 210 may, in conjunction with the processor 204, be configured to receive transaction records from resource providers, generate a user blockchain from those transaction records, and transmit the user blockchain to a client device associated with the user. In some embodiments, the record management module 210 may, upon receiving transaction details, generate a first hash of the transaction information and a second hash of the user information. The two hashes may then be combined (e.g., concatenated). In some embodiments, the combined information or a derivative thereof (e.g., a hash of the combined information) may be used to generate a user/transaction message digest value. The user/transaction message digest value is then signed by the validation node server 200 using a private key associated with the validation node server 200. This signed information may be referred to throughout the disclosure as a signature. The signature, once generated, may be appended to a transaction record within a user blockchain. Then, another entity may verify the legitimacy of an individual transaction record within the ledger using a corresponding public key. Once a ledger has been updated to include new transaction record information, that ledger may be made available to a client device associated with the user by the record management module 210.

In some embodiments, the resource provider computer 104 may be any type of computing device that is capable of receiving an electronic record from a client device, verifying that a validation node server 200 has signed the electronic record, and determining whether or not to grant access to a resource to the user of the client device based on the electronic record. In at least some embodiments, the resource provider computer 104 may include at least one memory 220 and one or more processing units (or processor(s)) 222. Similar to the validation node server 200, the resource provider computer 104 may also include additional storage 206.

Turning to the contents of the memory 220 in more detail, the memory 220 may include an operating system 224 and one or more application programs or services for implementing the features disclosed herein including at least a module for verifying the authenticity of an electronic record (verification module 226) and/or a module for determining whether to authorize a transaction based on the electronic record (authorization module 228). The memory 220 may also include transaction data 230, which provides data associated with historical transactions conducted by the resource provider computer 104.

In some embodiments, the verification module 226 may, in conjunction with the processor 222, be configured to verify the authenticity of one or more transaction records of a ledger received from a client device. In some embodiments, the resource provider computer 104 may maintain a public key associated with the validation node server 200. To verify the authenticity of a transaction record, the verification module 226 may independently generate a user/transaction message digest value for the signature by using a process similar to that performed by the record management module 210 of the validation node server 200. The signature may then be verified by the verification module 226 using the public key associated with the validation node server 200. The verification module 226 may compare the independently generated user/transaction message digest value to the a value obtained by applying the public key to the signature using a verification algorithm. A match indicates that the transaction record is legitimate.

In some embodiments, the authorization module 228 may, in conjunction with the processor 222, be configured to determine whether to authorize a transaction based upon transaction records within the provided ledger. In some embodiments, the transaction records may reflect either positively or negatively upon the user's creditworthiness. For example, a transaction record may indicate either that a user failed to pay a bill or that the user paid the bill on time. The authorization module 228 may use an algorithm particular to the resource provider computer 104 to calculate a creditworthiness for the user based on the transaction records in the ledger. In some cases, each resource provider computer 104 may assign a different weight to a particular transaction record.

The validation node server 200 and/or the resource provider computer 104 may also contain communications interface(s) 216 that enable the respective server to communicate with a stored database, another computing device or server, one or more remote devices, other application servers, and/or any other suitable electronic devices. In some embodiments, the communication interface 216 may enable the server to communicate with other electronic devices on a network (e.g., on a private network). The respective server 104 may also include input/output (I/O) device(s) and/or ports 218, such as for enabling connection with a keyboard, a mouse, a pen, a voice input device, a touch input device, a display, speakers, a printer, etc.

Figure 3:
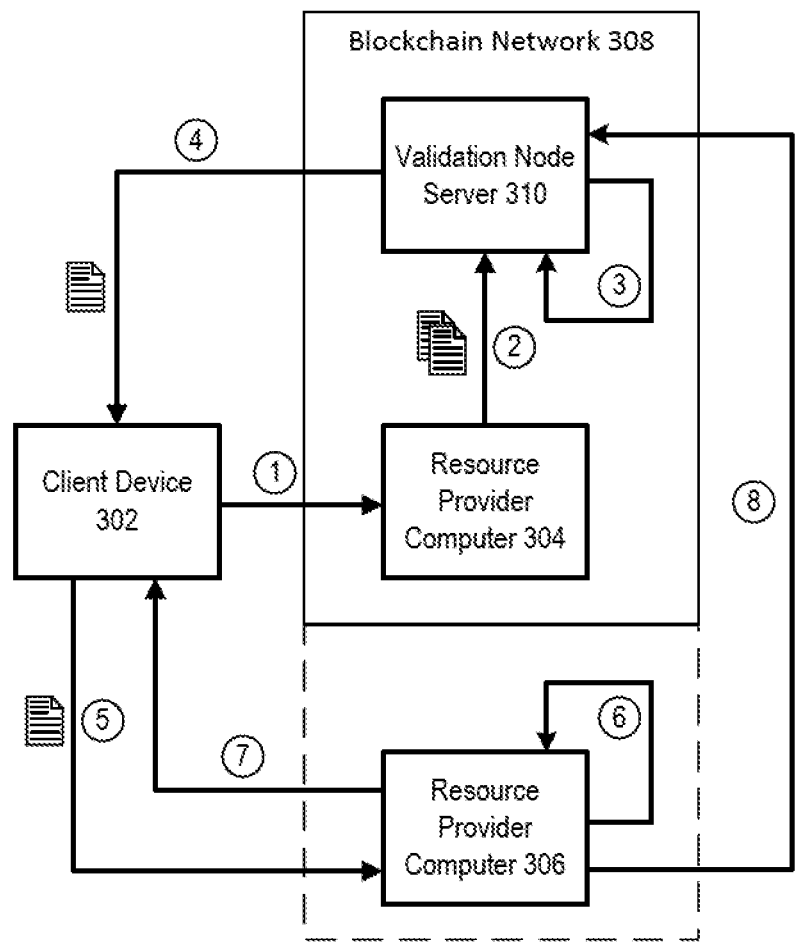
FIG. 3 depicts an illustrative example of a process that may be performed in accordance with at least some embodiments of the disclosure.

FIG. 3 depicts an illustrative example of a process 300 that may be performed in accordance with at least some embodiments of the disclosure. In FIG. 3, a client device 302 may be in communication with one or resource provider computers (e.g., resource provider computer 304 and/or resource provider computer 306). Each of the devices may be in communication with a blockchain network 308 having a number of blockchain node servers 310. In some embodiments, at least some of the resource provider computers 304 and/or 306 may be blockchain node servers 308.

By way of non-limiting illustration, each of the resource provider computer 304 and the resource provider computer 306 may be computing devices operated by resource provider entities (e.g., merchants, banking institutions, etc.). In this example, a user may open an account to be maintained by the blockchain network 308 at a first point in time, and may subsequently be provided with an electronic record associated with that user. During an enrollment process, the user may provide an identifier for the client device 302 (e.g., a phone number, secure element identifier, IMEI number, SIM card number, etc.) which is then associated with the user's account. In some embodiments, the blockchain network 308 may obtain transaction records for a user even if that user does not have an account with the blockchain network 308. For example, a number of resource provider computers 304 may continuously report transactions which they have conducted to the blockchain network 308. The blockchain network 308 may maintain a ledger in the form of a user blockchain for each unique user that includes each of the transaction records obtained with respect to that user. In embodiments in which the user does not enroll in an account with the blockchain network 308, a resource provider computer 304 or 306 may obtain a ledger associated with the user from the blockchain network 308. This may enable a resource provider computer to gain access to information on any transactions conducted by the user, allowing that entity to better analyze risk associated with a user.

At step 1 of process 300, a client device 302 may transmit a ledger to a resource provider computer 304 in order to gain approval for a transaction. In some embodiments, the client device 302 may provide user information (e.g., an electronic identifier) to the resource provider computer 304 to initiate the transaction. In some embodiments, the resource provider computer 304 may independently generate an electronic identifier from user-specific information provided by the client device within the request. In some cases, the ledger may be provided to the resource provider computer 304 via a direct wireless communication channel. For example, the user may approach a point-of-sale (POS) terminal and request to purchase an item or service on credit. In order to prove creditworthiness, the user may cause the client device 302 to transmit the ledger to the POS terminal associated with the resource provider computer 304, which may then verify the ledger and determine the user's creditworthiness. In some embodiments, this may involve the user initiating a mobile application and/or logging into an account on the client device 302.

At step 2, the resource provider computer 304 may report details of the conducted transaction to the blockchain node server 308. For example, the resource provider computer 304 may report to a validation node server 310 any credit-impacting event (e.g., whether the resource provider computer 304 authorized the transaction). In some embodiments, the resource provider computer 304 may store the user's information and may continue to report credit impacting events after the transaction. For example, the resource provider computer 304 may report to the validation node server 310 whether the user has paid his or her bill on time, paid his or her bill late, or has not paid his or her bill. This may be repeated a number of times as a payment is made or not made. In some embodiments, the process 300 need not be initiated at step 1. For example, in some cases, the validation node server 310 may obtain transaction information from a number of resource provider computers 304 and 306 without any interaction from the client device 302 or the user.

At step 3, the blockchain node server 308 may update a ledger associated with the user (such as a user blockchain) to include the transaction information provided to it by the resource provider computer 304. In some embodiments, the blockchain node server 308 may first verify that the resource provider computer 304 is authorized to report on a transaction record. For example, the blockchain node server 308 may determine that the resource provider computer 304 is a trusted entity. In some cases, the blockchain node server 308 may have a database of identifiers associated with trusted resource provider computers. They may be trusted based upon a prior registration process and/or prior interaction. In some embodiments, the blockchain node server 308 may determine a level of trust to be associated with a particular entity. In these embodiments, the validation node server 310 may process the transaction record regardless of whether the resource provider computer 304 is a trusted entity, but may include an indication of the level of trust assigned to the resource provider computer 304 in the transaction record. In some embodiments, the validation node server 310 may also determine whether the transaction information is duplicative (e.g., already included in the user's ledger) prior to recording that transaction information.

Upon determining that the transaction information provided by the resource provider computer 304 can be recorded (e.g., that the resource provider computer 304 is authorized and the transaction information is not duplicative), the validation node server 310 may identify an appropriate ledger to be updated. In some embodiments, user ledgers may be stored in association with a respective electronic identifier, so that personal information cannot be mapped to particular transaction records. In some embodiments, the validation node server 310 may independently generate the electronic identifier from user information provided by the resource provider computer 304. In some embodiments, the resource provider computer 304 may provide the electronic identifier. The ledger may include a number of documents and/or transaction details that relate to the user's financial status. For example, the ledger may include references to assets associated with a user (e.g., property deeds, etc.), outstanding lines of credit for that user, and/or any other suitable information relevant to that user's financial standing.

At step 4, the client device 302 associated with the user may be given access to the updated ledger. In some embodiments, the client device 302 may be provided with a copy of the updated ledger. In some embodiments, the client device 302 may be provided with a location of, or link to, the updated ledger. The ledger may be a data file and may be made available to a mobile application installed on, and executed from, the client device 302. In some embodiments, the ledger may be encrypted to ensure that an unauthorized user does not gain access to transaction record information in the ledger.

At step 5, the client device 302 may transmit the ledger to a second resource provider computer 306 in order to gain approval for a second transaction. As in step 1, the client device 302 may provide user information (e.g., the electronic identifier) to the resource provider computer 306 to initiate the transaction, or the resource provider computer 306 may independently generate an electronic identifier from user-specific information provided by the client device within the request. In some cases, the ledger may be provided to the resource provider computer 306 via a direct wireless communication channel. In other embodiments, the client device 302 may provide (e.g., a URL) which can provide access to the ledger to the resource provider computer 306 information.

It should be noted that in some cases, the resource provider computer 306 may access (e.g., receive) a ledger from a source other than the client device 302. For example, upon receiving a request to conduct a transaction via the client device 302, the resource provider computer 304/306 may contact the blockchain network 308 to obtain a ledger associated with the user. In some embodiments, one or more of the resource provider computer 304 and 306 may also be blockchain node servers 310, which maintain a copy of the distributed ledger. In these embodiments, the appropriate ledger may be identified using an electronic identifier associated with the user. In some cases, the electronic identifier may be independently generated by the resource provider computer using user information provided. For example, upon receiving a request to perform a transaction that includes information related to a user, the resource provider may generate an electronic record from the provided information, identify an appropriate user blockchain, verify transaction records within the user blockchain, and determine whether to approve or decline the transaction based on transaction information within the user blockchain.

In order to request a ledger from the blockchain network 308, the resource provider computer 306 may be required to present an electronic identifier for the user. For example, the resource provider computer 306 may combine a number of information fields that any entity transacting with the user would have access to. In some embodiments, the resource provider computer 306 may then further process the combined data (e.g., by hashing that data) into an electronic identifier. For example, the first entity server may create an electronic identifier by combining user specific information such as a country code, customer name, date of birth, and last four digits of a social security number such as "SHA256 (USA*JOHN SMITH*19700101*1234)." In this example, the first entity server may then hash this electronic identifier using a publicly available hash function to obtain a hash of the electronic identifier such as the string "444E982513BF546050C2D079FF5D65AB6E318E1AB5 C1C0BC5F810D35348745 FBA12A." A ledger for the user may be identified and provided to the resource provider computer 306. In this way, the ledger may be provided to any entity which is in possession of certain user-specific information, while hashing the user-specific information prevents that user-specific information from being obtained by an unauthorized third party. Additionally, there is no way to ascertain the electronic identifier from the hash value. This means that the validation node server 310 may require any requestor of user data to provide the electronic identifier in order to prove that the requestor has authority to access the user data. This prevents an unauthorized entity from stumbling upon the transaction record and simply requesting sensitive user information from the validation node server 310, as the unauthorized entity would not have access to the electronic identifier. Additionally, simply providing randomly generated electronic identifiers would be unfruitful as the requestor would be unable to map any information obtained to a particular user.

By way of illustrative example, consider the following scenario. In some embodiments, at least one of the resource provider entities (e.g., the resource provider computer 304 and/or the resource provider computer 306) may maintain a physical location. For example, the resource provider may comprises a banking institution operating a branch location. In this example, a user operating the client device 302 may enter the branch location in order to establish an account, request a loan, or perform any other suitable operation. The user may independently provide a number of personal and/or financial details to the banking institution, which may subsequently be stored with respect to the user in record data by the banking institution servers. In addition, the banking institution may generate (from the user's personal details) an electronic identifier associated with the user. Upon verifying the authenticity of the user, the banking institution may either receive a ledger from the user's client device 302 or request a ledger from the blockchain network 308.

At step 6, the resource provider computer 306 may verify the authenticity of one or more transaction records within the ledger and determine whether the transaction is to be approved. In some embodiments, the resource provider computer 306 may verify portions of the ledger (e.g., individual transaction records associated with the electronic record). To do this, the resource provider computer 306 may identify the blockchain network 308 that signed the transaction records associated with the electronic record, identify that blockchain network's public key (e.g., from a repository of public keys), independently generate a user/transaction message digest, and use the identified public key to verify that the transaction record was signed using the blockchain network's private key. This may involve verifying the transaction record using the public key in order to verify a particular format or content of the transaction record. For example, this may involve comparing the generated user/transaction message digest to a value obtained from the signature from the transaction record. In some embodiments, the resource provider computer 306 may verify each transaction record in the ledger. In some embodiments, the resource provider computer 306 may verify only a portion of the transaction records in the ledger. For example, the resource provider computer 306 may randomly select transaction records from the ledger to verify.

At step 7, the resource provider computer 306 may respond to the client device 302 with an indication as to whether the transaction is approved. To determine whether or not to approve the transaction, the resource provider computer 306 may identify the different entities associated with each transaction record in the ledger and determine a trust value to be associated with each of those entities. The resource provider computer 306 may then identify each entity associated with a trust value that exceeds a trust threshold value from which to obtain user data. Because the resource provider computer 306 is provided with a ledger that includes all relevant transaction records, the resource provider computer 306 is able to use a proprietary algorithm for making creditworthiness assessments. The proprietary algorithm may assign weights to factors associated with each transaction record differently. For example, the resource provider computer 306 may assign a greater weight to transaction records that involve a resource provider similar to itself. In a second example, if the user of the client device 302 is associated with many different transaction records involving two very large, well known and trustworthy banks, and two smaller merchants that are not very well known, then the trust values for the banks may be determined to be higher than the trust value for the smaller merchants since the banks are well known and subject to strict government regulation whereas the smaller merchants are not. In this scenario, the resource provider computer 306 may make a determination as to whether or not to approve the transaction based only on the transaction records associated with the banks.

At step 8, the resource provider computer 306 may report the details of the conducted transaction to the blockchain node server 308. Steps 3 and 4 may then be repeated in order to provide the client device 302 with an updated ledger that includes the latest transaction data. It should be noted that, as indicated by the dotted line, the resource provider computer 306 may or may not be a participant in the blockchain network 308. In some embodiments, the resource provider computer 306 need not even have access to a network connection. As long as the resource provider computer 306 has access to the public key associated with the blockchain network 308, the resource provider computer 306 is able to verify the authenticity of the ledger and may make a creditworthiness determination without conducting a conventional credit check.

Figure 4:
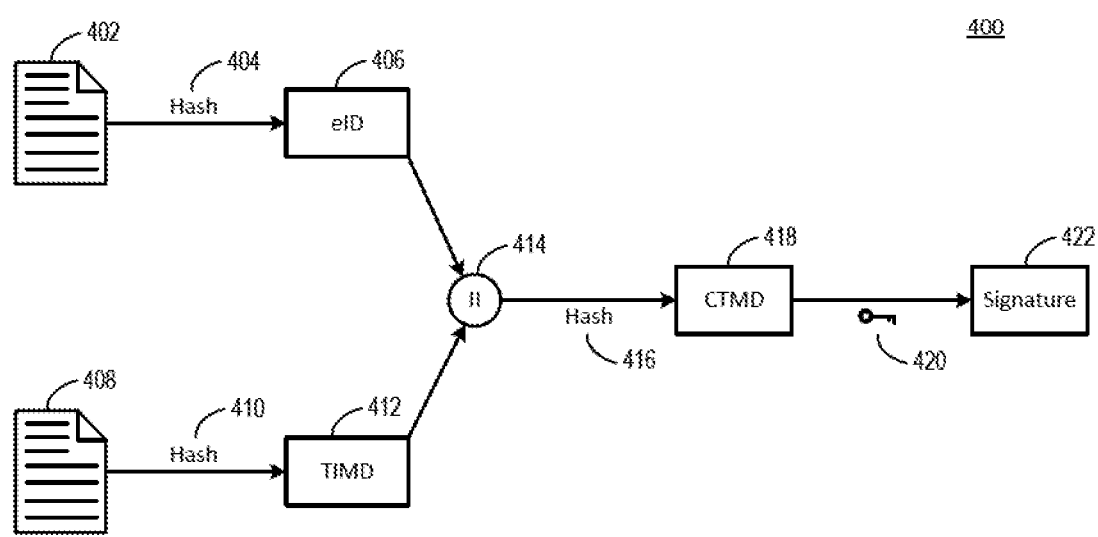
FIG. 4 depicts an illustrative example of a process for generating a signature that may be appended to a transaction record within a ledger in order to enable verification of that transaction record in accordance with at least some embodiments.

FIG. 4 depicts an illustrative example of a process 400 for generating a signature that may be appended to a transaction record within a ledger in order to enable verification of that transaction record in accordance with at least some embodiments. The process 400 may be generated by a validation node server 200 as depicted in FIG. 2.

In some embodiments, the validation node server 200 may be provided with user information 402. Upon receiving the user information 402, the validation node server 200 may identify values for particular fields of the user information to be combined into a text string. The user information 402 may include any user-specific information. In some embodiments, the text string may include a combination of information that would be accessible to any entity that is running a credit check on the user. In one illustrative example, the validation node server 200 may combine a country code, customer name, date of birth, and last four digits of a social security number into a text string. This text string may then be subjected to a hashing algorithm at 404 in order to obtain an electronic identifier 406.

In some embodiments, the validation node server 200 may also be provided with transaction information 408. Upon receiving the transaction, the validation node server 200 may identify values for particular fields of the transaction information to 408 be combined into a text string. In one illustrative example, the validation node server 200 may combine a resource provider id, amount, and date of transaction into a text string. This text string may then be subjected to a hashing algorithm at 410 in order to obtain a transaction information message digest 412.

At 414, the blockchain node server may combine the electronic identifier 406 and the transaction information message digest 412 into a single text string. The information may be combined in a concatenation process in some embodiments. For example, in some embodiments, each of the two text strings (the electronic identifier 406 and the transaction information message digest 412) may be converted into a numeric string and the two numeric strings may then be added in order to form a third string. In some embodiments, this third string may be subjected to a hashing algorithm 416 in order to generate a user/transaction message digest 418. The transaction message digest 418 may be a derivative of the third string, which may be a text string.

Once the user/transaction message digest 418 has been generated, the blockchain node server may sign the user/transaction message digest 418 at 420 in order to generate a signature 422. To "sign" the user/transaction message digest 418, the blockchain node server may use one or more encryption algorithms, along with a private key associated with the blockchain network. The signature may then be appended to a transaction record which is added to a user blockchain. The signature may then be used by a resource provider, along with user information and the information within the transaction record, to verify the authenticity of the transaction record within the user record. The process may be repeated to generate a signature for each transaction record within a user blockchain.

In order to verify the signature generated using the process above, a resource provider may independently generate the user/transaction message digest 418 in the manner described above (using provided user information and the transaction information in the transaction record). The resource provider may then verify the signature by using one or more verification algorithms, along with a public key associated with the blockchain network. The independently generated user/transaction message digest 418 is then compared to a value obtained using the public key, signature, and a verification algorithm, and the resource provider computer determines whether the two values match. A match indicates a verified signature.

The use of digital signature process illustrated in FIG. 4 provides for a number of advantages. First, the transaction and user data can be subjected to at least three hashing processes, which provides greater protection for the underlying information. Further, the data provided by user information 402 and the transaction information 412 is unique so that the resulting message digest 418 is unique to that particular transaction and is immutable.

Figure 5:
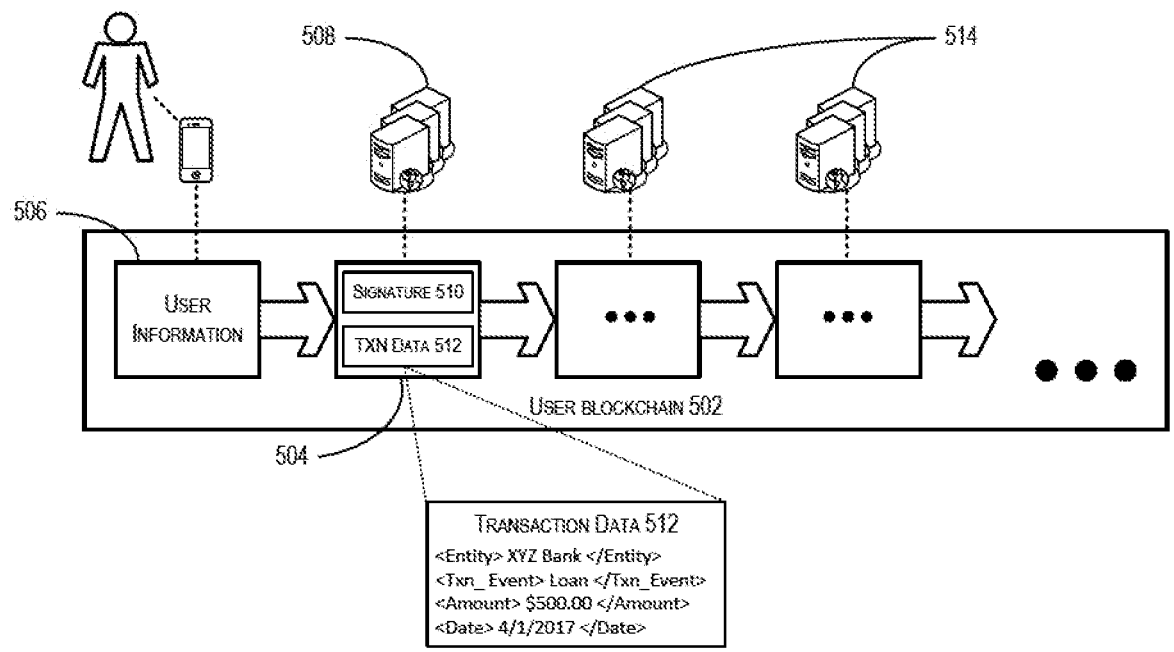
FIG. 5 depicts an example electronic record that may be implemented in accordance with embodiments of the disclosure.

FIG. 5 depicts an example electronic record that may be implemented in accordance with embodiments of the disclosure. In FIG. 5, an electronic record, and in particular a user blockchain 502, may comprise a record of transaction records 504 related to a particular user which is distributed across a blockchain network. In some embodiments, the user blockchain 502 may comprise a blockchain, in which a number of transaction records related to various electronic identifiers are processed in a "block," the record of which is then distributed to a number of nodes of the blockchain network.

As described above, a number of transaction records 504 may be associated with a user blockchain 502. In some embodiments, the user blockchain contains only records of transactions by the user, and no other users. The user blockchain 502 may include user information 506, which may be formatted as an electronic identifier. In some embodiments, the electronic identifier may be generated with respect to the user, which may be a particular person, device, or entity. In some embodiments, the electronic identifier may be generated using user information provided via a client device or during a user enrollment. In some embodiments, the electronic identifier may be generated by a blockchain node server that receives transaction records related to the user based on information provided about that user. The electronic identifier may be generated according to a specified format using information related to the user.

As the person, device, or entity conducts transactions with various entities, servers 508 associated with those entities may generate transaction records and transmit them to the blockchain network to be appended to the user blockchain 502. In some embodiments, each transaction record appended to the user blockchain 502 may include a signature 510 that may be used to verify the authenticity of the transaction record. Signature 510 may be an example of the signature generated from the process 400 depicted in FIG. 4. The transaction record 504 may also include transaction data 512. In some embodiments, the transaction data 512 included in a transaction record 504 may include information related to the transaction conducted, the entity that conducted the transaction, or any other suitable information.

As the person, device, or entity associated with the user blockchain 502 conducts transactions with various other entities, additional servers 514 associated with those entities may generate additional transaction records that are subsequently provided to the blockchain network and associated with the user blockchain 502. The transaction records are each signed by a validation node of the blockchain network and appended to the user blockchain 502. In this way, the user blockchain 502 may be generated to include a number of transactions conducted between the person, device, or entity and various other entities. The user blockchain 502 may be used to assess a credit rating, transaction history, credentials, or any other suitable report for the person, device, or entity.

Figure 6:
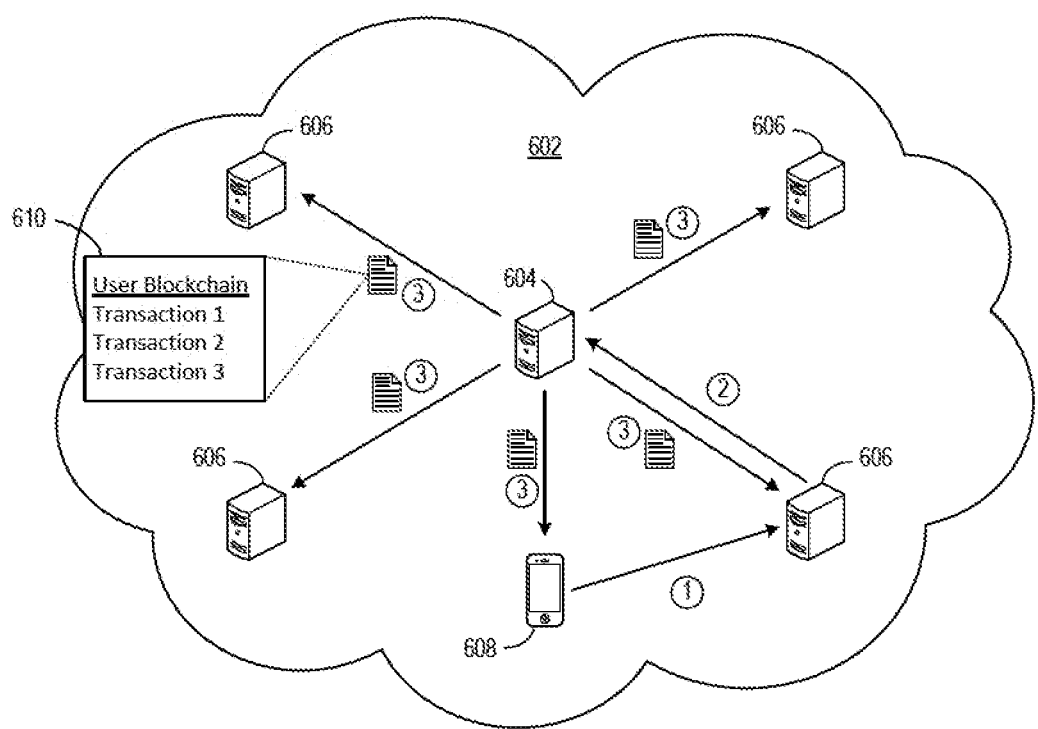
FIG. 6 depicts an illustrative example of interactions between components of the described system that may be implemented in accordance with at least some embodiments.

FIG. 6 depicts an illustrative example of interactions between components of the described system that may be implemented in accordance with at least some embodiments. In FIG. 6, a blockchain network 602 is depicted as including a number of nodes. The nodes of the blockchain network 602 may include at least a validation node 604 and a number of acceptance nodes. In some embodiments, the acceptance nodes of the blockchain network 602 may also include servers 606 operated by resource providers which participate in the blockchain network 602. Additionally, the acceptance nodes of the blockchain network 602 may also include client devices 608 associated with users which participate in the blockchain network 602. In some embodiments, the validation node 604 of the blockchain network 602 may be owned and/or operated by a service provider entity that is separate from the resource provider entities and/or users that operate the acceptance nodes of the blockchain network 602.

In some embodiments, a transaction may be conducted between two nodes of the blockchain network 602. In one illustrative example, resource provider server 606 may be operated by a credit card issuer and a client device 608 (operated by a user) may be used to make a credit card payment on an account maintained by the credit card issuer at step 1. In this example, the resource provider server 606 may record the transaction in a database and update a status of the relevant account based on that transaction. Additionally, the credit card issuer may transmit a transaction record to the validation node 604 that includes details of the transaction at step 2. It should be noted that although FIG. 6 depicts the transaction as being initiated from a client device 608, in some embodiments, the transaction may be initiated by the resource provider server 606 itself. For example, a user may enroll in an automated payment system, in which payments are automatically conducted on a periodic basis.

Once the validation node 604 has received the transaction record from the resource provider server 606, the validation node 604 may append the transaction record to a user blockchain 610 associated with the account. The validation node 604 may then sign the transaction record of the user blockchain 610 using a private key which is only available to the validation node 604. At step 3, the updated user blockchain may be distributed to each of the validation nodes 604 and acceptance nodes of the blockchain network 602, to include at least each of the resource provider servers 606. In some embodiments, the user blockchain may only be sent to those client devices 608 associated with the user for which the user blockchain 610 is maintained.

The user blockchain 610 may include information related to a number of transactions conducted with respect to a particular user and may be distributed to each validation node 604 and at least a portion of the acceptance nodes of the blockchain network. In some embodiments, when a user requests a resource (e.g., a service or good) from a resource provider that maintains an acceptance node of the blockchain network 602, a resource provider computer 606 associated with the resource provider may query a repository to identify a user blockchain 610 associated with the user. Once located, the resource provider computer 606 may verify the authenticity of the user blockchain 610. Upon verification of the user blockchain 610, the resource provider computer 606 may determine a level of risk to be associated with the user based on the user blockchain. For example, the resource provider computer 606 may assign weighted values to each transaction record in the user blockchain 610 based on a number of factors. In this example, the resource provider computer 610 may then estimate a level of risk by summing the weighted values. In some embodiments, the resource provider computer 606 may only authorize the transaction upon determining that the level of risk is below a predetermined threshold value.

Figure 7:
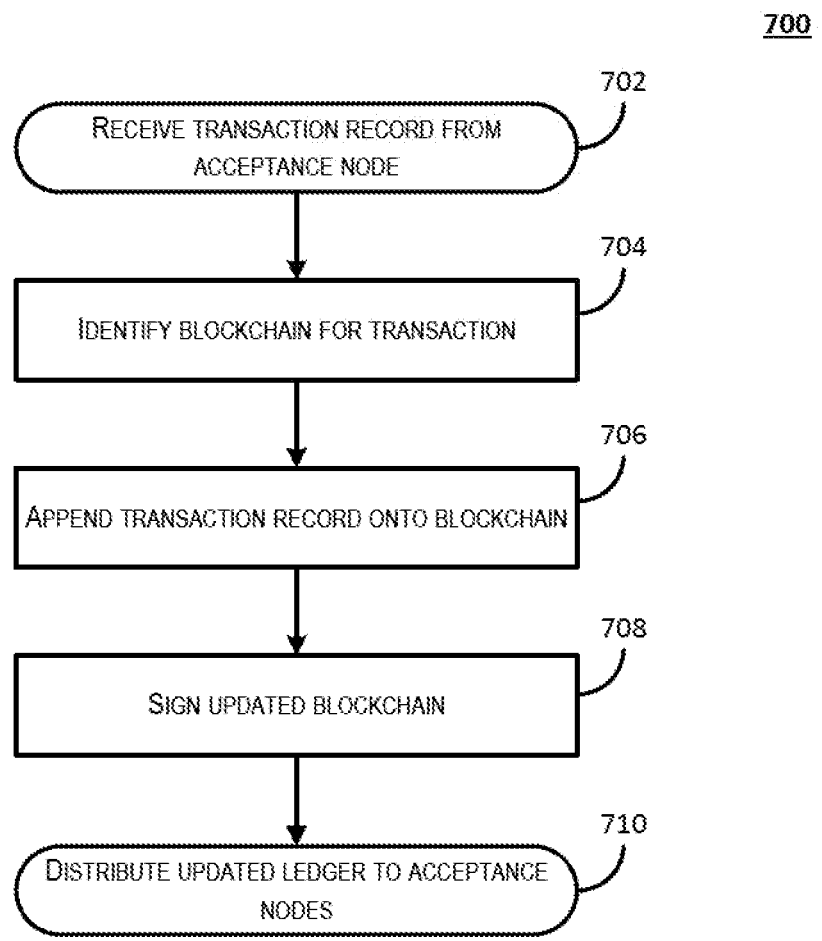
FIG. 7 depicts an example process for generating and maintaining an electronic record within a distributed environment in accordance with at least some embodiments.

FIG. 7 depicts an example process for generating and maintaining an electronic record within a distributed environment in accordance with at least some embodiments. Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by at least a validation node server as depicted in FIG. 2. The validation node server may be a node of a blockchain network. The code may be stored on a computer-readable storage medium, for example, in the form of a computer program including a plurality of instructions executable by one or more processors. The computer-readable storage medium may be non-transitory.

Process 700 may begin at 702, when a transaction record is received from an acceptance node (e.g., a resource provider computer). In some embodiments, the validation node server may first determine whether the acceptance node is authorized to participate within the blockchain network. For example, the validation node server may determine whether the acceptance node is a trusted entity (e.g. certified). Upon determining that the acceptance node is authorized to participate in the blockchain network, the validation node may proceed to update a user blockchain based on the transaction record.

At 704, the transaction record may identify a user blockchain relevant to the received transaction record. In some embodiments, the relevant user blockchain may be identified based on an electronic identifier provided to the validation node server. Once the appropriate user blockchain has been identified, the validation node server may append the received transaction record to the identified user blockchain at 706. In some embodiments, the received transaction record may be appended to the user blockchain as it is received. In some embodiments, the transaction record appended to the user blockchain may vary from the transaction record received by the validation node server, but may include information obtained from the received transaction record. For example, the transaction record appended to the user blockchain may be in a different format then the transaction record received from the acceptance node. Upon appending the transaction record to the identified user record, the validation node server may sign the transaction record at 708 using a private key associated with the blockchain network. An example process for generating a signature that may be attached to the transaction record is described in greater detail with respect to FIG. 4 above.

At 710, once the identified user blockchain has been updated and signed, it may be distributed throughout the blockchain network. In particular, the updated user blockchain may be provided to each of the validation nodes within the blockchain network as well as at least some of the acceptance nodes within the blockchain network. For example, each acceptance node that represents a resource provider may be provided with the updated user blockchain, whereas only those acceptance nodes associated a client device to which the user blockchain pertains may be provided with the updated user blockchain.

Figure 8:
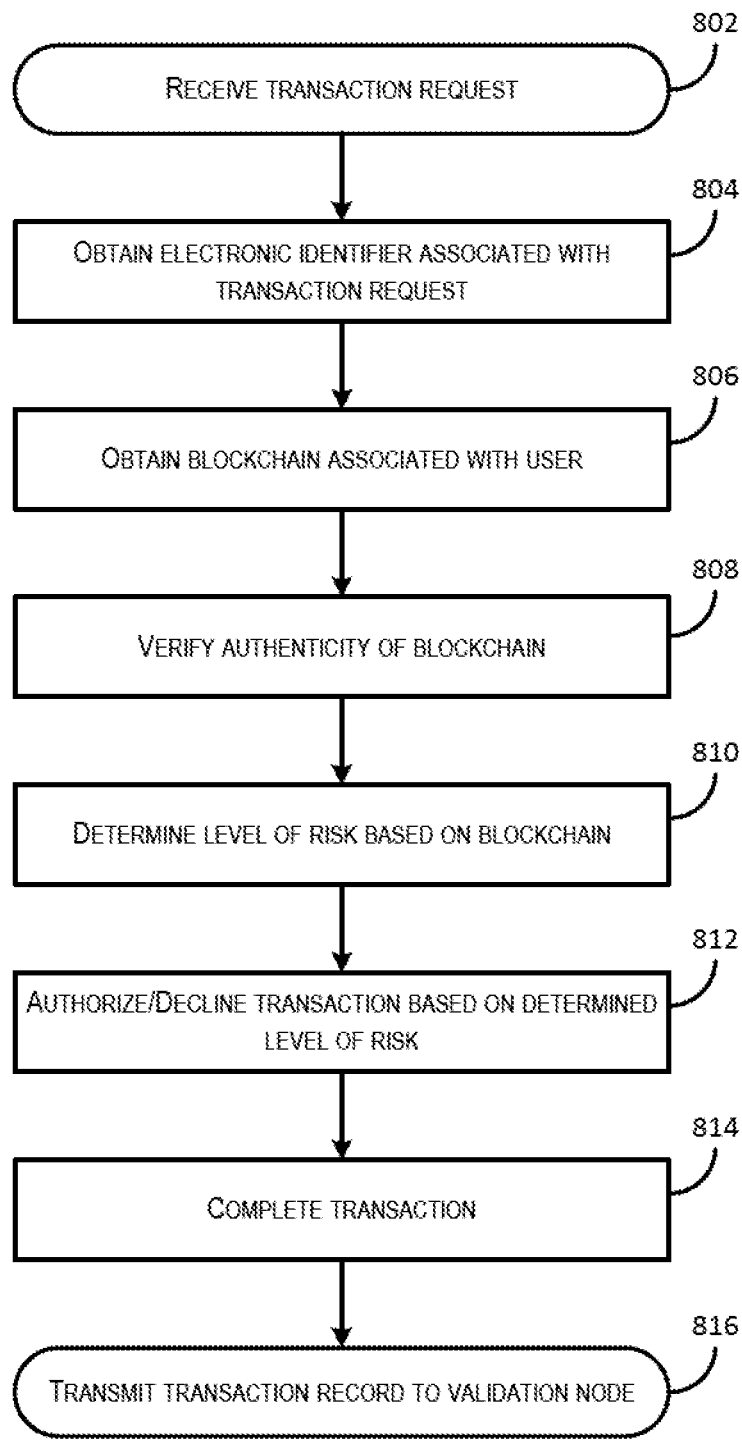
FIG. 8 depicts an example process for processing a transaction using a user blockchain maintained within a distributed environment in accordance with at least some embodiments.

FIG. 8 depicts an example process for processing a transaction using a user blockchain maintained within a distributed environment in accordance with at least some embodiments. In accordance with at least one embodiment, the process 800 of FIG. 8 may be performed by at least a resource provider computer 104 as depicted in FIG. 1 and FIG. 2. The resource provider computer may be an acceptance node of a blockchain network. The code may be stored on a computer-readable storage medium, for example, in the form of a computer program including a plurality of instructions executable by one or more processors. The computer-readable storage medium may be non-transitory.

Process 800 may begin at 802, when a transaction request is received by a resource provider computer (e.g., a server operated by a resource provider). In some embodiments, the transaction request may be received along with an electronic identifier. In some embodiments, an electronic identifier may be generated based on user information provided in association with the transaction request (e.g., by combining and hashing various user data). In some embodiments, the transaction request may be a request to initiate a particular transaction/interaction between the resource provider computer and a particular person, device, or entity.

At 804, the resource provider computer may obtain an electronic identifier to be associated with the transaction request. In some embodiments, the electronic identifier may be generated based on user information provided by the user (e.g., via a client device operated by the user). In some embodiments, the user may provide the electronic identifier in the transaction request.

At 806, the resource provider computer may obtain an electronic record associated with the identified user. In some embodiments, the user may provider the user blockchain along with the transaction request. In some embodiments, the resource provider computer may query a repository of stored user blockchains (e.g., within a distributed database) based on the electronic identifier. Each transaction record of the obtained user blockchain may include an indication of an interaction that took place between the requestor and another entity (e.g., the resource provider or another entity). A transaction record may include at least a number of details related to such an interaction and a signature. The transaction details may include an indication of an origination entity (i.e., the resource provider with which the transaction was conducted).

At 808, the resource provider computer may verify the authenticity of at least a portion of the obtained user blockchain. In some embodiments, the resource provider computer may verify each transaction record in the user blockchain. In some embodiments, the resource provider computer may only verify a portion of the transaction records within the user blockchain (e.g., the last transaction record or a random subset of transaction records). In some embodiments, the user blockchain may be signed by a validation node of the blockchain network using the blockchain network's private key. In this way, the transaction records within the user blockchain may be verified by the resource provider computer using the blockchain network's public key and by independently generating a portion of a signature attached to the transaction record. The computing entity may store at least a portion of the user blockchain within a database. For example, the resource provider computer may populate a number of fields of a database entry with the received information.

At 810, the resource provider computer may determine a level of risk associated with a transaction indicated in the transaction request based on the transaction records in the user blockchain. For example, the resource provider computer may assess a level of financial ability and/or liquidity associated with the account. In some embodiments, the level of risk may be determined by comparing a number (and/or value) of assets associated with the account to liabilities associated with the account. In some embodiments, one or more of the transaction records may include an indication of a credit score assigned to the account based on an assessment of the account performed by the originating resource provider. It should be noted that once the resource provider computer has received the user blockchain, there are a number of ways in which one skilled in the art could determine a level of risk based on various transaction records within that user blockchain.

In some embodiments, the computing entity may calculate a trust value to be associated with each identified transaction record based on an entity from which the transaction record originated. A trust value may provide a quantitative representation of an amount to which the computing entity trusts information provided by the origination entity. In some embodiments, the trust value may be determined based on a type of the origination entity, a credit rating of the origination entity, a length of time that the origination entity has existed, a number of total transaction records submitted by the origination entity, or any other suitable information related to an origination entity. In some embodiments, the resource provider computer may filter, or remove from consideration, transaction records associated with origination entities that fail to exceed a predetermined trust value threshold.

In some embodiments, the resource provider computer may assign a weight to information within a particular transaction record based on a trust value associated with an origination resource provider associated with the transaction record. By way of illustrative example, the resource provider computer may determine that it trusts banking institutions more than it trusts private landlords. In this example, it may assign a high trust value to transaction records of the user blockchain that originate with a banking institution and a lower trust value to transaction records of the user blockchain that originate with a private landlord. In this example, a credit assessment from a transaction record associated with a banking institution may be given a greater weight than a credit assessment from a transaction record associated with a private landlord.

At 812, the resource provider computer may determine whether to conduct a transaction indicated in the transaction request based on the determined level of risk. For example, the computing entity may determine whether the level of risk is above or below a predetermined risk level threshold or whether the level of risk is within an acceptable range. In some embodiments, one or more of the identified transaction records may include an indication of a level of risk (e.g., a credit score). In this scenario, the resource provider computer (provided that a level of trust associated with the transaction record is above a trust level threshold) may adopt the level of risk indicated in the transaction record. Upon determining that the transaction should be conducted, the transaction is completed at 814.

At 816, the resource provider computer may generate a new transaction record related to the action indicated in the transaction request and transmit that transaction record to a validation node to be appended to the user blockchain. In some embodiments, the resource provider computer may generate a new transaction record upon completing the requested transaction (i.e., when the action has been approved). In some embodiments, the resource provider computer may generate a transaction record whether the transaction is approved or declined, with an indication as to the status of the transaction. It should be noted that in some embodiments, the user blockchain may be updated whether or not permission is received from a user of the account associated with the electronic record. For example, the user blockchain may be used as a credit reporting tool, wherein each transaction record reflects an interaction with another entity, whether positive or negative. In this example, a resource provider computer need not seek approval from an account holder to create a new transaction record associated with that account. In accordance with at least some embodiments, process 700 described above may then be performed by the validation node server upon receiving the generated transaction record.

Embodiments of the invention provide for a number of technical advantages. For example, an electronic record for a particular user is able to be provided to a resource provider by a service provider or by the user itself. However, even though a user may have access to his or her own user record, he or she is unable to edit that user blockchain as the user blockchain would then fail verification. In this way, a user blockchain may be used by a resource provider to perform a credit or other type of assessment even if the resource provider does not have access to traditional credit agency, or even an internet connection. Users and resource providers alike have full, unfettered access to any particular electronic record. Accordingly, the disclosure provides a system in which electronic records are fully accessible, and yet are still secure.

Additionally, the system of the disclosure provides for a number of additional advantages. For example, the system can act as a decentralized credit authority, in that an electronic record may be analyzed by a service provider in order to make a more accurate determination as to the level of risk associated with a particular user or device. In this example, the service provider is able to analyze each transaction conducted between a user and another entity. The service provider may determine how much weight to give each of those transactions based on a level of trust that it has for the parties to the transaction. Rather than simply accepting a credit score from a credit bureau, the service provider is given access to raw data and may utilize its own algorithm to assess risk.

Further, the digital signature process described above, performs multiple independent hashing steps on multiple data elements to a transaction, and then hashes the combination to provide a unique signature to the transaction record that is secure and immutable.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of electronic records in order to assess a risk level of an action, an electronic record can also be used to access data or other services. For example, electronic records may be used to gain access to a location or service (e.g., a train ride or concert). In this example, the electronic record may include an transaction record which indicates that a ticket has been associated with an account.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a validation node from an acceptance node, a transaction record for a transaction conducted between the acceptance node and a user, the transaction record including at least information related to the user and transaction details;
   identifying, based on the information related to the user, a blockchain associated with the transaction conducted between the acceptance node and the user;
   appending the transaction record to the blockchain;
   generating a signature by:
     generating a first hash of at least a portion of the information related to the user;
     generating a second hash of at least a portion of the transaction details;
     combining the first hash and the second hash into a text string,
       wherein combining the first hash and the second hash comprises concatenating the first hash and the second hash;
     hashing the text string to form a third hash, the third hash being a derivative of the text string; and
     signing the derivative of the text string, using a private key associated with the validation node to form the signature;
   attaching the signature to the transaction record that is appended to the blockchain to update the blockchain, wherein the blockchain is a ledger storing information regarding transactions conducted between one or more acceptance nodes and the user; and
   sending, to the one or more acceptance nodes that are associated with one or more resource providers computers, the updated blockchain;
   verifying, by the one or more resource providers computers, verify the a second transaction with the user based on the information stored in the updated blockchain;
   determining, by the one or more resource provider computers, determine a level of risk associated with the second transaction; and
   determining, by the one or more resource provider computers, determine whether to conduct the second transaction based on the determined level of risk.

2. The method of claim 1, wherein the acceptance node is a computer operated by a resource provider.

3. The method of claim 1, wherein the private key is an RSA encryption key.

4. The method of claim 1, wherein the blockchain comprises a plurality of nodes, and wherein the plurality of nodes includes at least a plurality of acceptance nodes.

5. The method of claim 1, wherein the blockchain comprises a plurality of nodes, and wherein the plurality of nodes includes at least a plurality of validation nodes.

6. The method according to claim 1, further comprising, after receiving the transaction record from the acceptance node, determining that the acceptance node is authorized to participate in a blockchain network.

7. The method according to claim 1, wherein the blockchain associated with the transaction conducted between the acceptance node and the user is identified based on an electronic identifier.

8. The method of claim 1, further comprising determining whether the acceptance node is authorized to participate in a blockchain network prior to appending the transaction record to the blockchain.

9. The method of claim 1, wherein the first hash of at least a portion of the user information comprises an electronic identifier.

10. The method of claim 1, further comprising distributing the blockchain to a client device associated with the user.

11. A system comprising:
   a validation node server comprising:
     one or more processors; and
     a memory including instructions that, when executed by the one or more processors, cause the validation node server to:
       receive, from an acceptance node server, a transaction information for a transaction conducted between the acceptance node server and a user, the transaction information including at least user information and transaction details;
       identify, based on the user information, a blockchain associated with the transaction;
       generate a transaction record based at least in part on the transaction information;
       append the transaction record to the blockchain;
       generate a signature by:
         generating a first hash of at least a portion of the user information;
         generating a second hash of at least a portion of the transaction details;
         combining the first hash and the second hash into a text string,
           wherein combining the first hash and the second hash comprises concatenating the first hash and the second hash;
         hashing the text string to form a third hash, the third hash being a derivative of the text string; and
         signing the derivative of the text string, using a private key associated with the validation node server to form the signature; and
       attach the signature to the transaction record that is appended the blockchain to update the blockchain, wherein the blockchain is a ledger storing information regarding transactions conducted between one or more acceptance nodes and the user; and
       send to the one or more acceptance nodes that are associated with one or more resource providers computers, the updated blockchain; and the one or more resource provider computers each comprising a processor and a memory including instructions that, when executed by the processor, cause the one or more resource provider computers to:
verify a second transaction with the user based on the information stored in the updated blockchain;
determine a level of risk associated with the second transaction; and
determine whether to conduct the second transaction based on the determined level of risk.

12. The system of claim 11, wherein the instructions further cause the validation node server to distribute a public key within a blockchain network.

13. The system of claim 11, wherein the instructions further cause the validation node server to determine whether the acceptance node server is authorized to participate in a blockchain network prior to appending the transaction record to the blockchain.

14. The system of claim 11, wherein the first hash of at least a portion of the user information comprises an electronic identifier.

15. The system of claim 11, wherein the instructions further cause the validation node server to distribute the blockchain to a client device associated with the user.

16. The system of claim 11, wherein the acceptance node server is a computer operated by a resource provider.

17. The system of claim 11, wherein the private key is an RSA encryption key.

18. The system of claim 11, wherein the blockchain comprises a plurality of nodes, and wherein the plurality of nodes includes at least a plurality of acceptance nodes.

19. The system of claim 11, wherein the blockchain comprises a plurality of nodes, and wherein the plurality of nodes includes at least a plurality of validation nodes.

* * * * *